United States Patent [19]

Johnson

[11] 3,783,300

[45] Jan. 1, 1974

[54] AUTOMATIC PHOTOMULTIPLIER TUBE VOLTAGE CONTROLLER

[75] Inventor: Wayne F. Johnson, Loudon, Tenn.

[73] Assignee: The United States of America as represented by the United States Atomic Energy Commission, Washington, D.C.

[22] Filed: Sept. 18, 1972

[21] Appl. No.: 289,906

[52] U.S. Cl. ............... 250/564, 250/206, 356/179, 356/205
[51] Int. Cl. ........................................... G01n 21/26
[58] Field of Search............... 250/206, 207, 208, 250/214, 218; 356/51, 96, 97, 214, 205, 179

[56] References Cited
UNITED STATES PATENTS

| | | | |
|---|---|---|---|
| 3,680,957 | 8/1972 | Fokuda | 356/97 |
| 3,656,116 | 4/1972 | Jansen | 250/218 |
| 3,634,868 | 1/1972 | Pelavin | 356/179 |

Primary Examiner—Walter Stolwein
Assistant Examiner—D. C. Nelms
Attorney—John A. Horan

[57] ABSTRACT

The repeating chain of pulses of a GeMSAEC analytical photometer is referenced to a constant amplitude water blank pulse that is sampled with each revolution of the rotor. A feedback circuit samples the amplitude of the water blank cuvet signal by means of a fast-acting solid state switch. It assures that the water blank signal amplitude remains constant by controlling the photomultiplier tube high voltage supply following comparison of the water blank transmission signal with a very well regulated reference voltage. Thus, in the event of photomultiplier gain change or power supply drift during operation, automatic restoration of the photometer data transmission signals to their correct values will occur.

3 Claims, 1 Drawing Figure

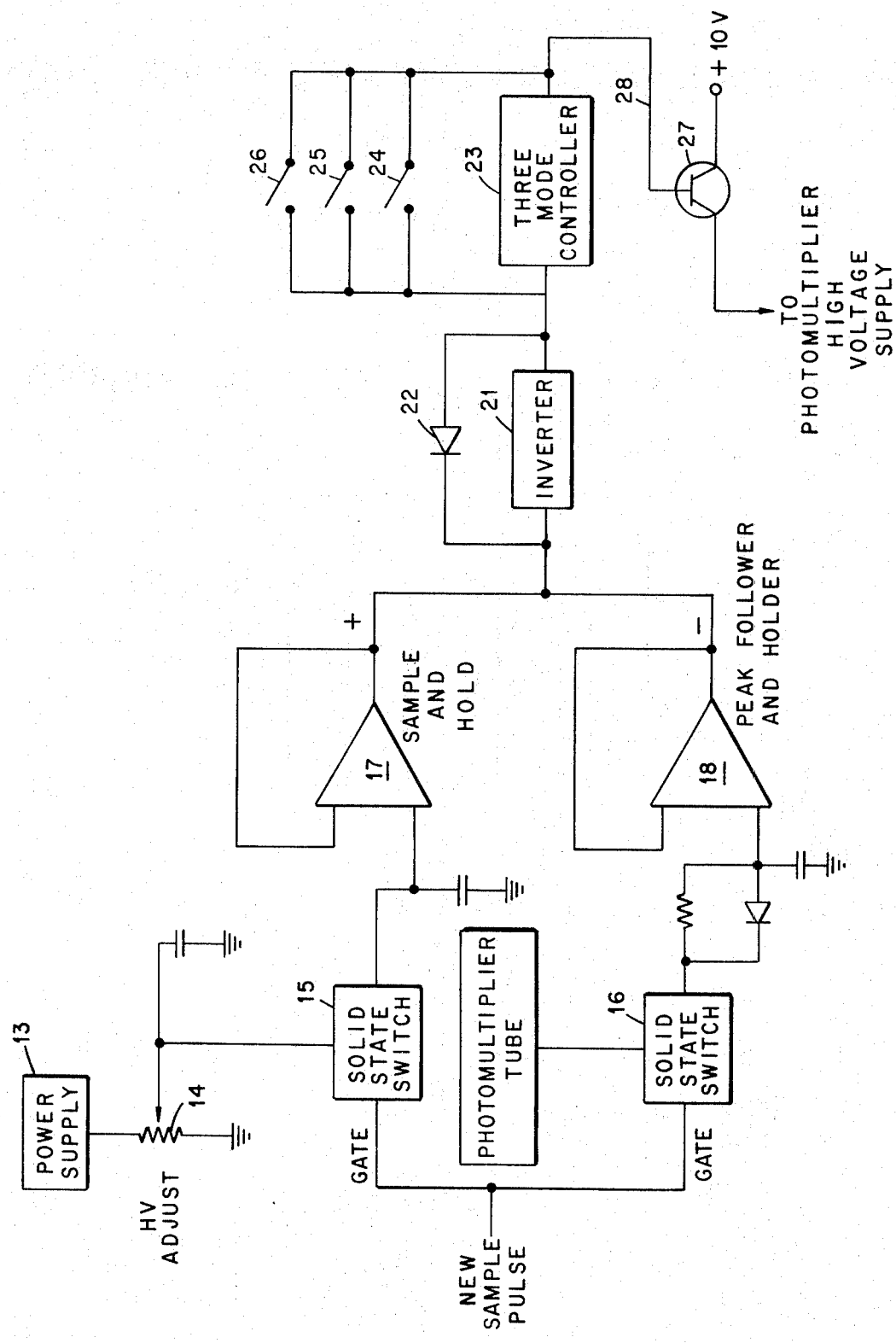

AUTOMATIC PHOTOMULTIPLIER TUBE VOLTAGE CONTROLLER

BACKGROUND OF THE INVENTON

This invention was made in the course of, or under, a contract with the United States Atomic Energy Commission.

For the past several years, the Molecular Anatomy (MAN) Program of the Oak Ridge National Laboratory has been involved in developing advanced analytical concepts and automated analytical systems for the clinical laboratory. Of the various systems developed, the GeMSAEC Fast Analyzer has been one of the most successful. This system, which is now being used in several clinical laboratories, employs centrifugal force to move samples and reagents together in a multicuvet rotor, where they are mixed and allowed to react. A stationary photometer scans all of the cuvets during rotation, and the resulting signal for each cuvet is acquired and evaluated in real time by an on-line computer, allowing the course of 15 to 42 reactions to be observed as they occur.

A miniaturized GeMSAEC Fast Analyzer has been developed to demonstrate improved economy and reduced size for clinical use. Such analyzers are described in Report ORNL-4771, May 1972, and in copending U.S. Pat. application assigned to the assignee of this application, Ser. No. 295,780 filed Oct. 6, 1972 (AEC Docket S-42,365).

A GeMSAEC photometer is normally operated by loading the samples and reagents into the transfer disk and moving the solutions out into the cuvet area. The operator, using an oscilloscope, adjusts the high voltage power supply for the photomultiplier tube that receives the transmission data signals. The photomultiplier tube voltage is increased until the pulse height for cuvet No. 1 (which is normally a water blank) is in the range of 9–9.5 volts. This usually requires 15–30 seconds and data can then be taken. The commercially available photometers are operated in the same manner.

One problem with such a configuration is that the operator can overshoot, saturate the photomultiplier tube, and cause it to burn out. Even more bothersome for many applications is the absence of any feedback in the system. If the photomultiplier high voltage power supply drifts, or, more commonly, if the gain of the photomultiplier tube changes, there is no automatic compensation. The result is that all the data values will be in error by the amount of the unknown gain or drift. If a minicomputer is used, the problem disappears because the computer can reference all the data values back to cuvet No. 1. However, if a simplified system is wanted, it would be preferable to hold the water blank signal at a fixed voltage regardless of high voltage or photomultiplier gain or drift. By so doing, the data signals from the other cuvets would remain constant. The water blank output signal can be maintained at a desired fixed voltage if some means could be provided to regulate or control the photomultiplier high voltage supply when referenced to the water blank signal. The present invention was conceived to meet this need in a manner to be described hereinbelow.

SUMMARY OF THE INVENTION

It is the object of the present invention to provide a system for maintaining the water blank output signal amplitude from a GeMSAEC analytical photometer constant during operation thereof.

The above object has been accomplished in the present invention by providing a feedback circuit which samples the amplitude of the water blank cuvet output signal of the above photometer by means of a fast-acting solid state switch. It assures that the water blank signal amplitude remains constant by controlling the photomultiplier tube high voltage supply following comparison of the water blank transmission signal with a very well regulated reference voltage.

BRIEF DESCRIPTION OF THE DRAWING

The single FIGURE in the drawing is a schematic wiring diagram of the system of the present invention to regulate the input to the high voltage photomultiplier supply of an analytical photometer.

DESCRIPTION OF THE PREFERRED EMBODIMENT

The present invention may be utilized with the GeMSAEC analytical photometer system described in U. S. Pat. No. 3,555,284, issued Jan. 12, 1971, to Norman G. Anderson, with the miniaturized system described in the above-mentioned report, ORNL-4771, or with any other similar analytical photometer system.

In order to hold the water blank output signal from an analytical photometer system at a fixed voltage, the cuvet containing the water blank should be sampled with each revolution of the rotor. This is now possible with the present invention wherein use is made of some recently available fast-acting solid state switches. The feedback circuit, shown in the single figure of the drawing, brings the first cuvet (containing the water blank), not shown, up to its desired output voltage within 3 seconds and maintains it for the length of the run.

The fast-acting solid state switches 15 and 16 utilized in the system shown in the single figure in the drawing are each a Model 640-1 Seren DIP Solid State SPST Relay, manufactured by Teledyne Relays, 3155 W. El Segundo Boulevard, Hawthorne, California 90250. Each such unit is a completely solid state replacement for reed relays and features low noise, low contact resistance, bounceless switching, and switching rates up to 100 KHz.

In the drawing, transmission data signals from the photomultiplier tube of a photometer system are routed to the input of a solid state switch 16. A reference voltage from a well regulated power supply 13 and a potentiometer 14 is applied to the input of the solid state switch 15. When the peak value of the first cuvet (water blank) voltage is being transmitted, the rotor of the photometer system, not shown, provides a gating signal (new sample pulse) of about 5 volts to the switches 15 and 16 to gate them ON. The resistance through these switches quickly goes to zero, permitting the voltage values on the inputs to be passed through. The sample pulse, upon going back to zero, results in the normal high resistance condition in the switches 15 and 16. The voltage from the supply 13 and the potentiometer 14 corresponds to the 9 volts desired for cuvet No. 1 and is applied by means of a sample-and-hold unit 17 to an inverter 21. The actual cuvet No. 1 voltage (water blank) is applied to the same inverter 21 through a peak follower and holder unit 18, although it is of opposite polarity to the reference voltage from the unit 17. The resultant signal to the inverter 21, then, is in a direction to correct the voltage from the photomultiplier high voltage supply when the first cuvet pulse is different from the reference voltage derived from the power supply 13.

The inverter 21, which may have a negative gain of one-tenth, for example, provides the right polarity for the three-mode controller 23. A diode 22 is connected as a feedback across the inverter 21 to allow the inverter to only operate in a direction calling for additional voltage. This prevents a reset capacitor in the controller 23 from charging in the opposite direction. The potentiometer high voltage supply 13, 14 is always positive; it will never be taken negative, so the diode 22 on the inverter does not permit the controller reset capacitor to charge in the opposite direction when the controller voltage becomes zero. The three modes of operation of the controller 23 are (1) rate, (2) proportional, and (3) reset. For a general discussion of a typical three-mode controller, reference may be made to an article in *Instruments And Control Systems* — December 1971, pp. 235–244, entitled "Automatic Controller Action." The output of the controller 23 is connected by a lead 28 to a control transistor 27 in the input circuit of the existing photomultiplier high voltage supply. Thus, the controller 23 acts as a variable bias to the transistor 27 such that the photomultiplier high voltage supply is regulated, as needed, to maintain the water blank output signal from the photometer system at a desired constant value even in the event of photomultiplier gain changes or power supply drift during operation of the photometer system. Thus automatic restoration of the photometer data transmission signals to their correct values will occur.

Some safety features are included in the circuit shown in the drawing. For example, there is no need to have high voltage on the photomultiplier tube if the transmission lamp of the photometer system is off. Otherwise, the circuit would bring the photomultiplier supply up to its maximum voltage and, when the lamp is turned on, the photomultiplier tube would saturate and burn out. Likewise, when the rotor is stopped, the three-mode controller should not give any output signal. Again, when changing filters for the transmission pulses of the photometer system, no control signal should be given to the photomultiplier supply. Switches 24, 25, and 26 provide for these safety features. Each is connected electrically across the feedback of the controller 23 and, when closed, takes the output of the controller to zero which in turn drops the photomultiplier supply to zero.

Another safety feature (not shown) could be added to the above circuit, if desired. This additional feature provides a comparator for closing a solid state switch that is connected across the controller feedback when any transmission pulse exceeds the maximum voltage value in the system (the water blank signal value of 9 volts). An erroneous signal of this sort is possible if the rotor suddenly stops or is slowed down since the amount of light received on the photomultiplier tube is a function of rotor speed.

This invention has been described by way of illustration rather than limitation and it should be apparent that it is equally applicable in fields other than those described.

What is claimed is:

1. In an analytical photometer device including a multicuvet rotor provided with a plurality of cuvets for receiving respective samples and reagents thereinto for mixing and reacting, means for rotating said rotor at a desired selected high speed, a stationary photometer system for scanning all of said cuvets during rotation of said rotor, at least one of said cuvets containing a water blank to provide an output signal for reference purposes, and an on-line computer connected to the output of said photometer system for evaluating the signal received from each of said cuvets during operation of said system, said photometer system including a photomultiplier tube and a source of photomultiplier high voltage supply, the improvement comprising a feedback circuit for maintaining said water blank cuvet output voltage signal at a desired constant value during operation of said photometer system, said feedback circuit including a first fast-acting solid state switch, a second fast-acting solid state switch, a well regulated power supply, a potentiometer connected between the output of said regulated power supply and said first switch to supply a desired reference voltage thereto corresponding to said desired water blank output voltage signal, the output of said photomultiplier tube connected to said second switch, means connected to both of said switches for gating them ON in response to rotor position and at the instant the water blank output signal from said photometer system is at its peak value, a sample-and-hold unit connected to the output of said first switch, a peak-follower-and-holder unit connected to the output of said second switch and in turn providing an output having a polarity opposite to the output of said sample-and-hold unit, an inverter, circuit means for combining the signal outputs of said sample-and-hold unit and said peak-follower-and-holder unit and feeding such a combined output signal as an input to said inverter, a diode connected as a feedback across said inverter, a three-mode controller connected to the output of said inverter, a control transistor connected in the input circuit of said photomultiplier high voltage supply, and circuit means for connecting the output of said controller to said control transistor, whereby said feedback circuit maintains said water blank output voltage signal at a desired constant value even in the event of photomultiplier gain changes or power supply drift during operation of said photometer system.

2. The device set forth in claim 1, wherein said reference voltage is set at 9 volts.

3. The device set forth in claim 1, wherein said feedback circuit further includes at least three safety control switches connected in parallel and across said controller as a feedback, each of said switches when closed taking the output of said controller to zero which in turn drops said photomultiplier supply to zero by means of said control transistor, each of said safety control switches being actuated to a closed position in response to respective operating conditions of said photometer system during which time there is no need to have high voltage on said photomultiplier tube.

* * * * *